US009323721B1

(12) United States Patent
Banerjee et al.

(10) Patent No.: US 9,323,721 B1
(45) Date of Patent: Apr. 26, 2016

(54) QUOTATION IDENTIFICATION (71) Applicant: Google Inc., Mountain View, CA (US)

(72) Inventors: Avishek Banerjee, Bangalore (IN); Kartik Singh, New Dehli (IN); Sarveshwar Duddu, Bangalore (IN)

(73) Assignee: Google Inc., Mountain View, CA (US)

( * ) Notice: Subject to any disclaimer, the term of this patent is extended or adjusted under 35 U.S.C. 154(b) by 322 days.

(21) Appl. No.: 13/778,921

(22) Filed: Feb. 27, 2013

(51) Int. Cl.
*G06F 17/21* (2006.01)
*G06F 17/30* (2006.01)

(52) U.S. Cl.
CPC ............... *G06F 17/21* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 5,488,725 A * | 1/1996 | Turtle et al. | |
| 6,363,377 B1 * | 3/2002 | Kravets | G06F 17/3071 |
| 6,411,950 B1 | 6/2002 | Moriez et al. | |
| 6,728,725 B2 * | 4/2004 | Garfield et al. | |
| 7,003,511 B1 * | 2/2006 | Antonov | G06F 17/30657 707/730 |
| 8,086,557 B2 * | 12/2011 | Ait-Mokhtar | G06F 17/3061 706/45 |
| 8,086,592 B2 * | 12/2011 | Mion | G06F 17/30 707/711 |
| 2,006,620 A1 | 3/2012 | Suman et al. | |
| 8,566,340 B2 * | 10/2013 | Udupa | G06F 17/30646 707/767 |
| 8,645,125 B2 * | 2/2014 | Liang | G06F 17/2775 704/251 |
| 8,676,795 B1 * | 3/2014 | Durgin | G06F 17/2715 707/730 |
| 8,694,528 B2 * | 4/2014 | Li | G06F 17/3087 707/765 |
| 8,725,736 B2 * | 5/2014 | Gallivan | G06F 17/30616 707/738 |
| 8,775,465 B2 * | 7/2014 | Peyrichoux | G06F 17/3089 707/770 |
| 8,819,001 B1 * | 8/2014 | Zhang | G06F 17/30687 707/708 |
| 8,868,558 B2 * | 10/2014 | Blanco | G06F 17/30867 707/736 |
| 9,092,506 B1 * | 7/2015 | Kates | G06F 17/30604 |
| 2009/0210404 A1 | 8/2009 | Wilson | |
| 2012/0117050 A1 | 5/2012 | Vasudevan et al. | |
| 2013/0006914 A1 | 1/2013 | Ray et al. | |
| 2013/0110823 A1 | 5/2013 | Su et al. | |
| 2013/0159340 A1 | 6/2013 | Blanco et al. | |

OTHER PUBLICATIONS

Ernst-Gerlach et al., Identifying Quotations in Reference Works and Primary Materials, 2008, Springer-Verlag Berlin Heidelberg, pp. 78-87.*

Liang et al., A Large-Scale System for Annotating and Querying Quotations in News Feeds, Apr. 26-30, 2010.*

(Continued)

*Primary Examiner* — Barbara Reinier
(74) *Attorney, Agent, or Firm* — Fish & Richardson P.C.

(57) ABSTRACT

Methods, and systems, including computer programs encoded on computer-readable storage mediums, including a method for identifying quotations occurring in resources. The method includes identifying first and second quotations that occur in particular resources in a set of resources, each particular resource being classified as a quotation-related resource; determining, for each of the first and second quotations, a number of occurrences of the quotation in the set and a number of different resources in the set in which the quotation occurs; determining that the first quotation and the second quotation are (i) semantically related and (ii) not identical; selecting a representative quotation from among the first quotation and the second quotation; and storing the representative quotation, the number of occurrences of the representative quotation and the number of different resources in which the representative quotation occurs in association with an entity to which the representative quotation is attributed.

20 Claims, 5 Drawing Sheets

(56) References Cited

OTHER PUBLICATIONS

Office Action issued in U.S. Appl. No. 13/779,000 on Nov. 20, 2014, 34 pages.

Office Action issued in U.S. Appl. No. 13/779,000 on May 4, 2015, 35 pages.

* cited by examiner

QUOTATION IDENTIFICATION

TECHNICAL FIELD

This specification generally relates to identifying quotations in resources.

BACKGROUND

The Internet provides access to a wide variety of resources, for example, video resources, e.g., movies; audio resources, e.g., songs; and web page resources for particular subjects, e.g., web pages about famous persons, or current events, e.g., news web pages. Among other types of content, some resources include quotations. For example, a news resource can include a quotation from a politician, e.g., Governor John Smith stated that "under my leadership, the state has reduced its spending by twenty percent;" or an encyclopedia-type resource can include a quotation from a well-known scientist, e.g., scientist Jane Smith once noted that "my greatest invention came to me in a brief moment; however, that moment came to me only through many months of arduous labor."

SUMMARY

In general, one aspect of the subject matter described in this specification relates to identifying quotations occurring in the content of resources, e.g., web pages, and selecting particular ones of the identified quotations based on, for example, the frequency with which the quotations occur in the content of the resources, the recency of the time periods in which the quotations occurred, the number of different resources in which the quotations occur, or some combination thereof. Each selected quotation can be associated with an entity to which the quotation is attributed and stored for later use, e.g., on a resource including content about the entity.

The methods, for example, can include identifying first and second quotations that occur in particular resources in a set of resources, each of the particular resources being classified as a quotation-related resource; determining, for each of the first and second quotations, a number of occurrences of the quotation in the set of resources and a number of different resources in the set of resources in which the quotation occurs; determining that the first quotation and the second quotation are (i) semantically related and (ii) not identical; selecting, by one or more data processors, a representative quotation from among the first quotation and the second quotation; and storing the representative quotation, the number of occurrences of the representative quotation and the number of different resources in which the representative quotation occurs in association with an entity to which the representative quotation is attributed.

The methods can, for example, include identifying an entity for which quotations are to be identified based at least in part on a frequency of submitted search queries including a reference to the entity; identifying quotations attributable to the entity that occur in particular resources in a set of resources, each of the particular resources being classified as a news-related resource; determining, for each of the quotations, a recency of a time period in which the quotation occurred in each of the particular resources; determining a score for each quotation, relative to each other quotation, based at least in part on the recency of the time period of the quotation; and selecting one or more of the quotations for presentation on a resource about the entity based at least in part on the scores of the quotations.

Other embodiments of these aspects include corresponding systems, apparatus, and computer programs, configured to perform the actions of the methods, encoded on computer storage devices.

These and other embodiments can each optionally include one or more of the following features. Comparing the number of occurrences of the first quotation in the set of resources to the number of occurrences of the second quotation in the set of resources; and selecting the representative quotation based at least in part on the comparison. The first and second quotations can be content delimited by quotation marks in the particular resources.

The methods can include identifying a third quotation that occurs in particular resources, and filtering and discarding the third quotation based on one or more filtering conditions specifying restrictions on content of the quotation. The restrictions can include one or more of restrictions on numeric characters in the quotation, restrictions on the quotation commencing with lower case characters, restrictions on designated characters in the quotation, and restrictions on a number of capitalized terms in the quotation.

The methods can include discarding a one of the first and second quotations that is not the representative quotation. The methods can include determining, for each of the first and second quotations, that the number of occurrences of the quotation in the set of resources exceeds a minimum occurrences threshold and that the number of different resources in the set of resources in which the quotation occurs exceeds a minimum different resources threshold. The set of resources can include resources that are not classified as quotation-related resources and the numbers of occurrences of the first and second quotations include occurrences in the resources that are not classified as quotation-related resources.

The methods can include, for each quotation, quantifying a quality of a resource from which the quotation was identified, and determining a score for each quotation based at least in part on the recency of the time period and the quality measure of the quotation. The methods can include identifying the quotations based at least in part on a match of the quotations to one or more expression templates, each expression template specifying a pattern of content. The methods can include identifying the quotations based at least in part on a natural language extraction process. The methods can include identifying the entity based at least in part on numbers of resources referenced by search results for the submitted search queries that include quotations from the entity.

Particular implementations of the subject matter described in this specification can be implemented to realize one or more or none of the following advantages. Numerous quotes attributable to an entity can be automatically identified, filtered and canonicalized to select representative, e.g., frequently occurring or popular, quotations for the entity. Only quotations occurring in the content of a minimum number of different resources are selected to associate with entities to which the quotations are attributed. Such selection helps to ensure that private or outlier quotations, e.g., obscure or inaccurate quotations or quotations from persons not generally known to the public, occurring in the content of only a few "personal" or "suspect" resources are filtered out.

If multiple similar, but different, quotations attributable to an entity are identified, e.g., variants of the same quotation, a representative quotation from the multiple quotations is selected for association with the entity and stored in a database for later use. The remaining multiple quotations that are not selected are discarded to ensure that variants of the same quotation are not also stored to reduce system processing and storage requirements.

Quotations occurring in the content of resources classified as belonging to a news category or otherwise news related, can be selected based on the recency of the time periods of the quotations to ensure that only recently occurring quotations are selected, e.g., as recent news-related quotations are generally of more interest than stale or old news-related quotations. News-related quotations can also be selected based on the quality of the resource in which the quotations occur, e.g., the reputability of a resource as determined by online traffic at the resource or visitor feedback about the resource. Selecting news-related quotations occurring in high quality resources can increase the likelihood that, for example, the quotations are accurate and/or timely.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various figures indicate like elements.

DETAILED DESCRIPTION

This specification generally relates to identifying and selecting quotations occurring in the content of resources, e.g., web pages. In some implementations, the quotation identification and selection processes vary based on the category or classification of the resources in which the quotations occur. For example, for quotations occurring in resources categorized as belonging to a quotations category, or otherwise related to quotations, the number of occurrences of each quotation in all resources, e.g., all resources accessible through the Internet, and the number of different resources in which the quotation occurs are determined and used to select particular quotations to store in association with the respective entities to which the quotations are attributed.

By way of another example, for quotations occurring in resources categorized as belonging to a news category, or otherwise related to news or current events, the recency of the time period with which each quotation occurred in a resource and/or the quality of the resources in which the quotations occur are determined and used to select particular quotations to store in association with the respective entities to which the quotations are attributed. Regardless of how the quotations are selected, the quotations can be, for example, presented on resources about or concerning the respective entities.

Figure 1:
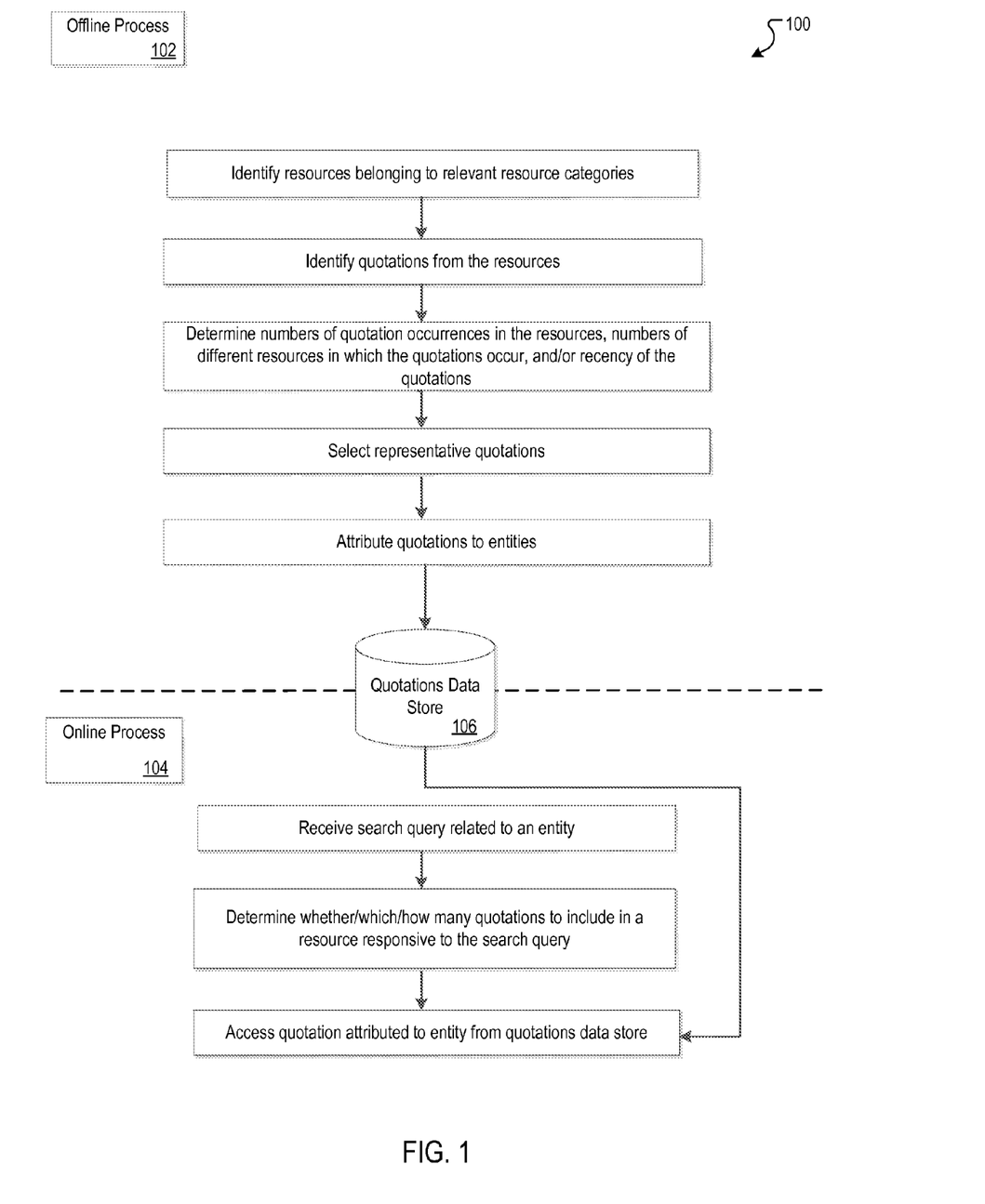
FIG. 1 is a block diagram of an example environment for identifying and selecting quotations.

FIG. 1 is a block diagram of an example environment 100 for identifying and selecting quotations. The example environment 100 includes an offline process 102, e.g., performed by a quotation identification system (not shown), and an online process 104, e.g., performed by a quotation presentation system (not shown). In some implementations, during the offline process 102, the quotation identification system identifies and stores quotations in a quotations data store 106 for later use, as described below. To facilitate storage of and access to the quotations, the quotations can be indexed in the quotations data store 106 by, for example, the respective entities to which they are attributed, the resources in which they occurred, the time/date at which they occurred on the resources, or some combination thereof.

During the online process 104, the quotation presentation system can access and retrieve quotations from the quotations data store 106 in response to receiving a quotation request. A quotation request for a quotation attributable to a particular entity can be initiated, for example, in conjunction with a resource concerning the entity being requested or rendered by a user device, e.g., requesting a search results page for a search query about the entity.

In some implementations, during the offline process 102, for example, the quotation identification system can identify, among others, popular or famous quotations from well-known or famous persons and/or recent news-related quotations from persons involved in or associated with current events. In some implementations, the quotation identification system identifies quotations, e.g., popular or famous quotations or news-related quotations, by first identifying resources likely to include quotations, for example, resources categorized or classified as being "quotation-related" resources or "news-related" resources. The quotation identification system can, for example, identify quotation-related and/or news-related resources by accessing or querying a data store specifying resources indexed by the subject matter category to which they belong or in which they are classified.

A quotation-related resource can be a resource that is classified, designated, or characterized as being quotation focused, e.g., dedicated to presenting, or otherwise including, quotations. A news-related resource can be a resource that is classified, designated, or characterized as being news focused, e.g., dedicated to presenting, or otherwise including, news or current events. A classification system can, for example, classify or categorize a resource as a quotation-related or news-related resource, or both, if the content or metadata of the resource meets predetermined criteria, e.g., the resource includes at least five quotations or the resource has previously been determined by evaluators to provide news content. The classification system is described further below.

Once a set of relevant resources have been identified, the quotation identification system can identify or extract quotations in the content of the resources. In some implementations, the quotation identification system identifies quotations in the content through an expression matching process. For example, the quotation identification system can evaluate content of the resource against one or more expression templates or regular expressions to identify quotations, as described below. However, other techniques can also be used.

Given a set of identified quotations, the quotation identification system, during the offline process 102, can process the quotations to determine certain attributes associated with the quotations. For example, the quotation identification system can determine attributes of a quotation such as the number of occurrences of the quotation in the resources, e.g., all or a subset of resources accessible through the Internet, the number of different resources in which the quotation occurs, the recency of the time period of the quotation, or some combination thereof. In some implementations, the quotation identification system can access or query an indexed data store storing the resources or storing representations of the resources to determine such information.

Based, at least in part, on these attributes the quotation identification system can select particular quotations as representative quotations. For example, the quotation identification system can filter the quotations to remove quotations that do not occur in a minimum number of resources, that do not have a minimum number of occurrences in the resources or that do not satisfy a recency threshold.

In some implementations, for example, after the filtering process, there may be groups of similar, e.g., semantically related, but not identical quotations. Such similar quotations can be, for example, variants of the same quotations occurring on different resources. For such groups of similar quotations, the quotation identification system can, for example, select one member of the group as the representative quotation for the group, e.g., based on particular attributes such as the number of occurrences of the quotations.

The quotation identification system can associate the identified, or only representative, quotations with the entity to which the quotation is attributed. For example, the quotation identification system can associate the quotations with entities to which the quotations are attributed based on the structure of the expression templates used to identify the quotations or through natural language processing the content of the resources on which the quotations occur, as described below. In some implementations, the quotation identification system can store quotations and entity associations in the quotations data store 106.

In some implementations, for example, the quotation presentation system is associated with or is in data communication with a search system or service such that, during the online process 104, the quotation presentation system is notified of or receives a search query related to an entity, e.g., a search query for "John Smith." In response to the search query, the quotation presentation system can, for example, determine whether, which and/or how many quotations to include in a resource responsive to the search query, e.g., in a section of the resource providing information about the entity, e.g., in a section of the search results resource.

In some implementations, the quotation presentation system determines whether to include a quotation in the responsive resource based on an analysis of search query record data. For example, the quotation presentation system determines to include one or more quotations in the responsive resource if the number of search queries referencing an entity, e.g., including quote-related suffixes for the entity such as "John Smith quotes" or John Smith quotations," satisfies a search query threshold.

The quotation presentation system can, for example, access the quotations data store 106 to identify quotations attributed to the entity. The quotation presentation system can select particular ones of the quotations attributed to the entity, for example, based on the number of times the quotations occur in resources, e.g., which can be an attribute stored in association with the quotation in the quotation data store 106. For example, the quotation presentation system can select the top two occurring quotations to include in the responsive resource.

Figure 2A:
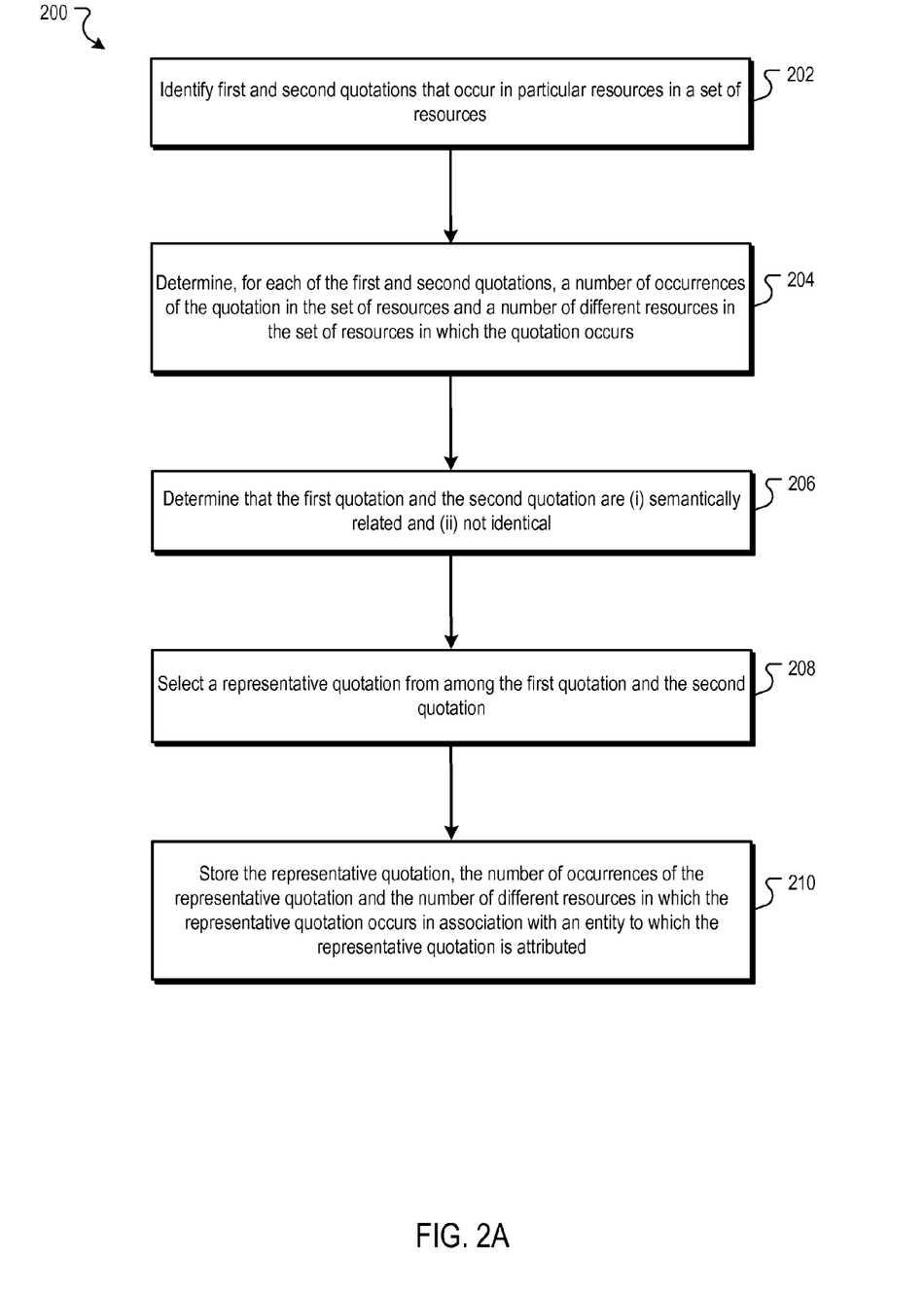
FIG. 2A is a flow diagram of an example process for identifying quotations from quotation-related resources.
Figure 3:
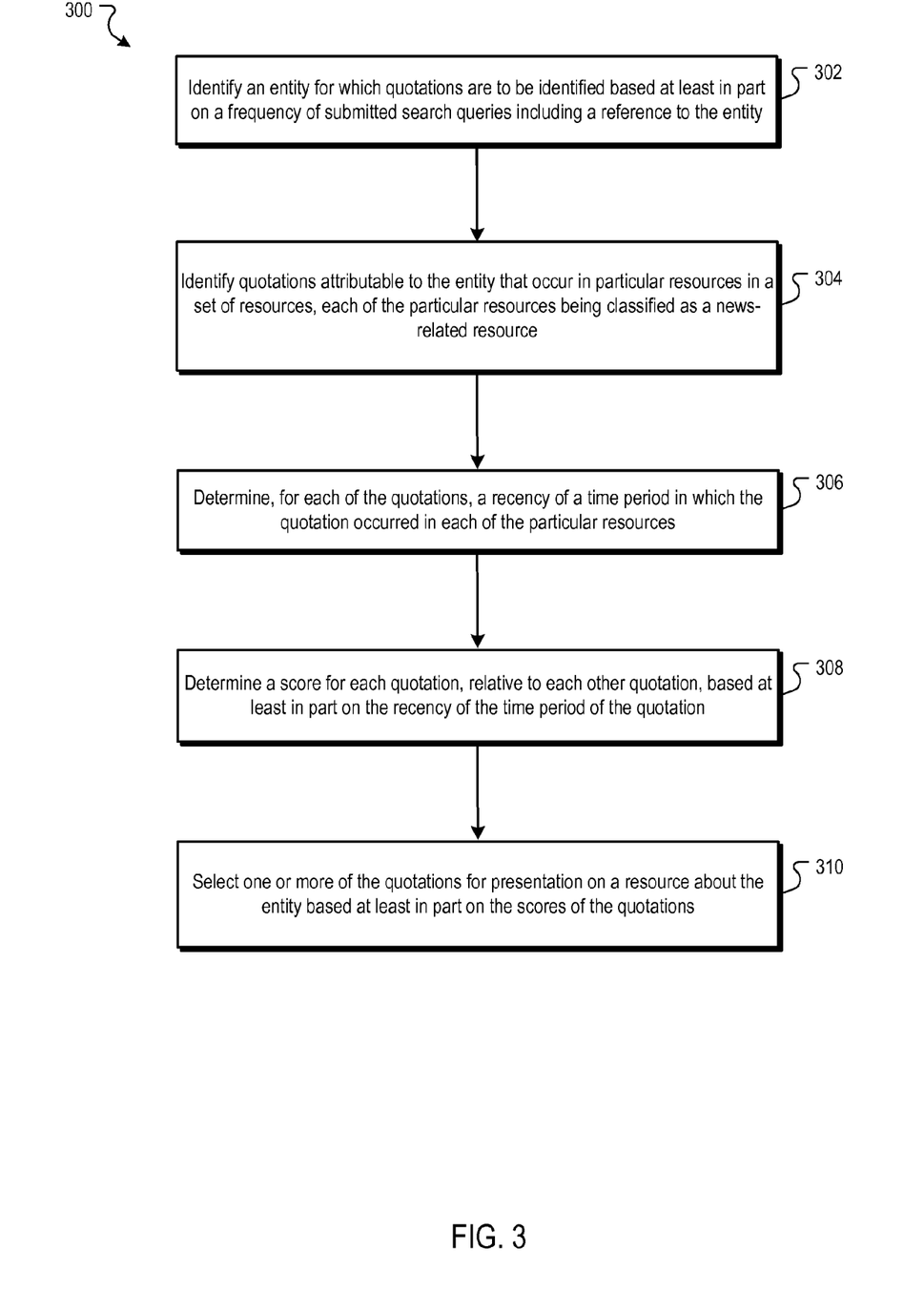
FIG. 3 is a flow diagram of an example process for identifying quotations from news-related resources.

As described above, quotations can be identified in numerous ways. Two such example ways are described with reference to FIGS. 2A and 3. FIG. 2A is a flow diagram of an example process 200 for identifying quotations from quotation-related resources. FIG. 3 is a flow diagram of an example process 300 for identifying quotations from news-related resources.

First, with respect to FIG. 2A, in some implementations, the process 200 can be performed during the offline process 102. The process 200 can be performed, for example, by one or more data processors or computer systems, e.g., by the quotation identification system.

First and second quotations that occur in particular resources in a set of resources are identified (202). In some implementations, each of the particular resources is classified as being a quotation-related resource. A resource 105 can be any data that can be provided over a network, e.g., such as wide area network (WAN), a local area network (LAN), the Internet, or a combination thereof. A resource can be identified by a resource address, e.g., uniform resource locator, "URL," that is associated with the resource 105. Resources can be accessed and manipulated by user devices and include HTML pages, word processing documents, portable document format (PDF) documents, images, video, and news feed sources, to name only a few. The resources can include content, such as words, phrases, images, video and sounds, that may include embedded information, such as meta-information hyperlinks, and/or embedded instructions, such as scripts.

A user device is an electronic device that is under control of a user and is capable of requesting and receiving resources over a network. Example user devices include personal computers, televisions with one or more processors embedded therein or coupled thereto, set top boxes, mobile communication devices, e.g., smartphones, tablet computers, e-readers, laptop computers, personal digital assistants (PDA), and other devices that can send and receive data over the network 102. A user device typically includes one or more user applications, such as a web browser, to facilitate the sending and receiving of data over the network.

A classification system, e.g., a web crawler, can access a network of resources to identify and classify such resources. For example, the classification system can classify resources based on the content of the resources, e.g., n-grams of terms in the resource content, the grammatical structure or syntax of the terms or the semantic context of the terms; based on hypertext markup language (HTML) or document object model (DOM) tags of the resources; based on the subject matter of other resources linking to or being linked from the resource, e.g., hyperlinks to and from other resources; or some combination thereof. In some implementations, the classification system periodically accesses the network to classify new resources or re-classify resources based on changes to the resources since the last time the resources were classified. Resources can be classified as belonging to one or more classifications. For example, a resource dedicated to providing current events in the world of sports can be classified as both a sports-related resource and a news-related resource.

In some implementations, the quotation identification system can access such resource classifications to determine quotation-related resources and identify quotations, e.g., the first and second quotations and each other quotation, occurring in the quotation-related resources. A quotation-related resource is, for example, a resource that has been classified as belonging to a quotation classification/category, e.g., as the resource includes a threshold number of quotations.

Figure 2B:
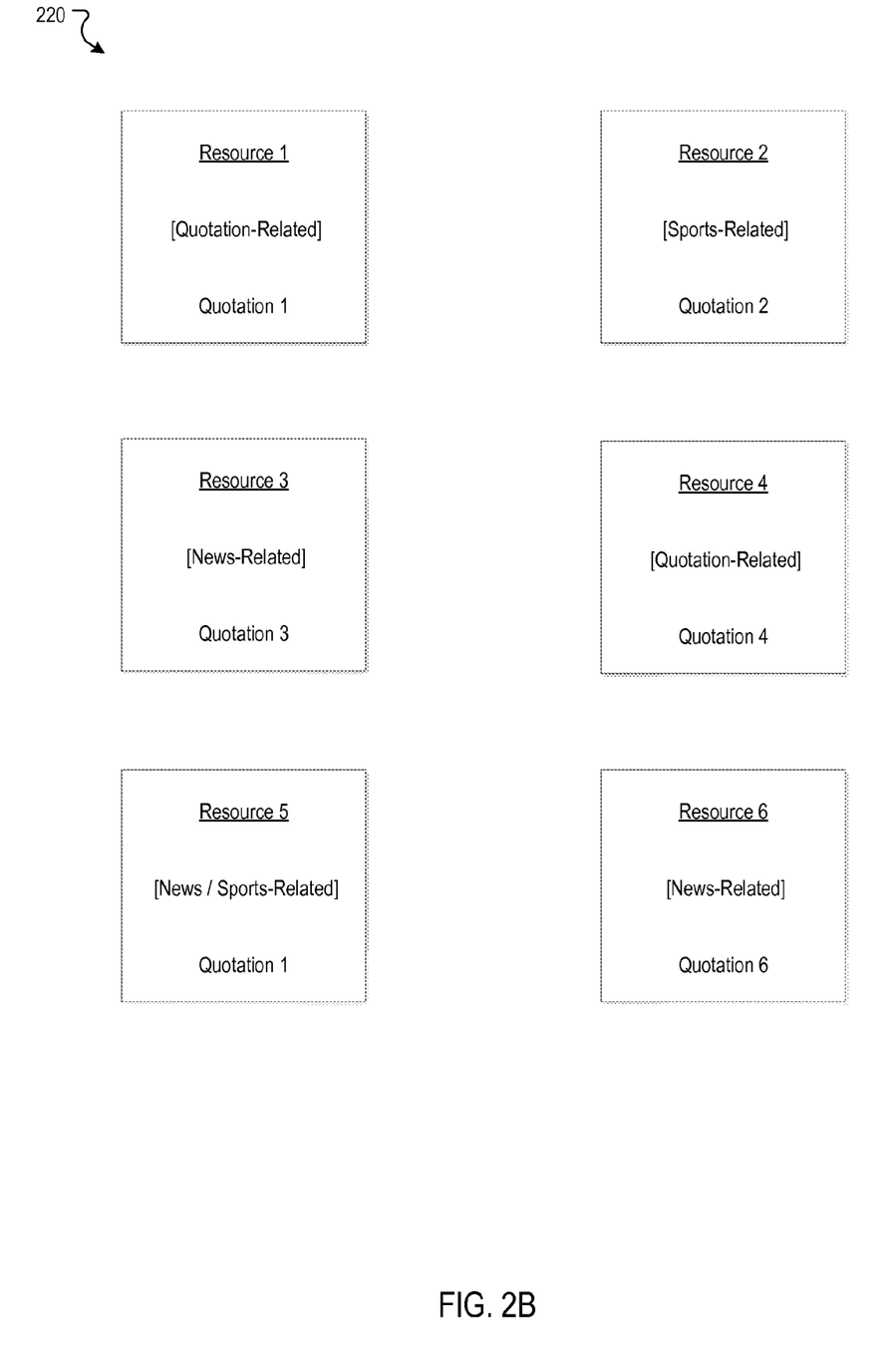
FIG. 2B depicts a set of resources in which quotations occur.

FIG. 2B depicts a set of resources 220 in which quotations occur. The set of resources 220 includes resource 1 classified as being quotation-related and including quotation 1, resource 2 classified as being sports-related and including quotation 2, resource 3 classified as being news-related and including quotation 3, resource 4 classified as being quotation-related and including quotation 4, resource 5 classified as being both news- and sports-related and including quotation 1, and resource 6 classified as being news-related and including quotation 6. Although only one quotation is shown for each resource, any given resource may include numerous quotations, e.g., tens, hundreds or thousands of quotations.

The set of resources 220 includes only two resources classified as being quotations-related resources, resources 1 and 4. As such, continuing with the above example, the quotation identification system determines resources 1 and 4 are quotation-related resources and proceeds to identify the quotations occurring only on these two resources, e.g., as no other resources in the set of resources 220 are classified as being quotations-related resources. The quotation identification system, for example, can identify quotation 1 as the first quotation and quotation 4 as the second quotation. The quotation identification system can identify one or more terms in the content of resources as being quotations in numerous ways.

In some implementations, the quotation identification system identifies quotations occurring in a resource, e.g., identifies terms in the content of the resource as being a quotation, by analyzing the content of the resource. For example, the quotation identification system can use an expression matching process to compare the HTML content of the resource to a set of expression templates. An expression template, e.g., a regular expression, defines a pattern of content, e.g., text, that describes or represents one or more variations of the pattern/content. For example, the quotation identification system can use the expression template '<sentence or phrase> said <entity>' or '<entity> stated that <sentence or phrase>' to identify the "sentence or phrase" as a quotation and "entity" as the entity to which the quotation is attributed. Thus the quotation identification system can use expression templates to identify the quotation "My childhood was unexceptional" from the resource content "My childhood was unexceptional said Mr. Smith." Further, based on the expression template, the quotation identification system can also attribute the quotation to Mr. Smith.

The quotation identification system can identify quotations by other techniques. In some implementations, one such technique includes identifying resource content as being a quotation if it is delimited with quotation marks, e.g., by parsing the HTML content of the resource. For example, the quotation identification system can identify the quotation "it was the longest day of my life" from the resource content "Mr. Smith noted that 'it was the longest day of my life' when referring to the day he was lost in the forest." Further, in some implementations, the quotation identification system can identify quotations based on natural language processing techniques, e.g., statistical machine learning algorithms as described below.

For each of the first and second quotations, a number of occurrences of the quotation in the set of resources and a number of different resources in the set of resources in which the quotation occurs are determined (204). The number of occurrences of the quotation in a set of resources defines the number of individual instances, e.g., appearances, of the quotation being in the content of resources in the set. The number of occurrences of the quotation in the set individually accounts for multiple occurrences of the quotation in the same resource and across different resources. For example, assuming the quotation 1 occurs once in each of the resources 1 and 5, the number of occurrences of the quotation 1 in the set 220 is two. By way of another example, assuming the quotation 1 occurs three times, e.g., once in the title of the resource 1, once in a footnote on the resource 1 and once in the body of the resource 1, and once in the body of the resource 5, the number of occurrences of the quotation 1 in the set 220 is four.

The number of different resources in the set of resources in which the quotation occurs defines the number of unique resources in the set in which the quotation occurs. For example, assuming the quotation 1 occurs once on each of the resources 1 and 5, the number of different resources in the set 220 in which the quotation occurs is two. By way of another example, assuming the quotation 1 occurs three times, e.g., once in the title of the resource 1, once in a footnote on the resource 1 and once in the body of the resource 1, and once in the body of the resource 5, the number of different resources in the set 220 in which the quotation occurs is still two, e.g., as the quotation 1 occurs in two unique resources.

The quotation identification system can, for example, determine the number of occurrences of the first and second quotations in a set of resources and a number of different resources in the set of resources in which the quotations occur. In some implementations, the quotation identification system determines the number of different resources in which the quotations occur and the number of occurrences of the first and second quotations from all resources, e.g., all resources accessible through the Internet including those not classified as not being quotations-related resources. In some implementations, the quotations identification system determines the number of different resources in which the quotations occur and the number of occurrences of the first and second quotations in only the resources classified as at least being quotations-related resources, as opposed to all resources accessible through the Internet.

In some implementations, the quotation identification system accesses a data store including data representing resources, e.g., populated with data generated by the classification system, and queries the data store or parses the data in the data store to determine the number of occurrences of a particular quotation in a set of resources and the number of different resources in the set in which the particular quotation occurs.

The quotation identification system can, for example, determine, e.g., for each of the first and second quotations and/or other identified quotations, whether the number of occurrences of the quotation in the set satisfies, e.g., exceeds, a minimum occurrences threshold and/or whether the number of different resources in the set in which the quotation occurs satisfies, e.g., exceeds, a minimum different resources threshold. The minimum occurrences threshold can be, for example, set by an administrator and be determined based on statistical analysis of the numbers of times the identified quotations occur, e.g., the median number of occurrences for all quotations. For example, the minimum occurrences threshold can, for example, be 10, 100, 1000 or many thousands or millions of occurrences.

The minimum different resources threshold can be, for example, set by an administrator and be determined based on statistical analysis of the numbers of different resources in which the identified quotations occur, e.g., the median number of different resources in which the identified quotations occur. For example, the minimum occurrences threshold can, for example, be 10, 100, 1000 or many thousands or millions of different resources.

In some implementations, the quotation identification system can, for example, discard or designate as non-qualifying, those quotations, e.g., identified in the process 202, that do not satisfy the minimum occurrences threshold and/or the minimum different resources threshold. For example, if the quotation identification system determines that a particular quotation occurs forty times in the resources and occurs in six different resources and the minimum occurrences threshold is fifty and the minimum different resources threshold is eight, then the quotation identification system can discard the particular quotation and prevent further processing of the particular quotation, e.g., further processing by the process 200.

Such discarding can, for example, reduce the likelihood that private quotations on personal resources will be processed in the process 200, e.g., as such quotations may be of interest to very few persons and, thus, would not be good candidates for presenting on a search results resource.

In some implementations, the identified quotations, e.g., that satisfy the minimum occurrences threshold and the minimum different resources threshold, are further processed, e.g., filtered, to remove quotations that do not satisfy certain filtering conditions specifying restrictions on content of the quotation. The quotation identification system can use such filtering to identify, e.g., and discard, quotations that are likely not good candidates, for example, for presentation on a search results resource. For example, such restrictions can include restrictions on numeric characters in the quotation, e.g., quotations with numbers; restrictions on the quotation commencing with lower case characters; restrictions on designated characters in the quotation, e.g., quotations that include special characters, for example, # and *, or more than a maximum number of special characters; restrictions on a number of capitalized terms in the quotation; to name just a few. In some implementations, when the quotation identification system determines a quotation, e.g., a third quotation, includes restricted content or does not satisfy the restrictions/filtering conditions, the quotation is discarded and is not further processed, e.g., in the process 200.

The first quotation and the second quotation are determined to be (i) semantically related and (ii) not identical (206). In some implementations, the quotation identification system processes the identified quotations to determine related quotations by forming clusters of semantically-related quotations, e.g., groups of similar quotations and variations of such quotations. For example, the quotation identification system clusters the identified quotations based on techniques such as hierarchical clustering and k-means clustering. The first quotation is, for example, "an eye for an eye will leave the whole word blind" and the second quotation is, for example, "an eye for an eye leaves everyone in the world blind." Given the similarity between the first and second quotations, the quotation identification system, for example, places the first and second quotations in the same cluster, e.g., based on processing the quotations with a k-means based algorithm. In a similar manner, the quotation identification system processes other identified quotations and places them in corresponding clusters.

In some implementations, the quotation identification system determines quotation variations among quotations in a given cluster, e.g., in each cluster. Quotation variations are variations of the same quotation or similar quotations. The first quotation of "an eye for an eye will leave the whole word blind" and the second quotation of "an eye for an eye leaves everyone in the world blind" are variations of the same quotation from Mahatma Gandhi. As the first and second quotations are in the same cluster, the quotation identification system determines the first and second quotations are quotation variations of the same quotation.

The quotation identification system, in some implementations, can, for example, identify quotations in the same cluster as quotation variations based on the edit distances, e.g., Levenshtein distances, between the quotations. An edit distance is the minimum number of edits needed to transform one quotation into another. When the edit distance between two quotations is below a specified threshold, e.g., three or five edits, the quotation identification system can determine that the quotations are quotation variations. Although in the above example the quotation identification system determined two quotations were quotation variations, quotation variations, e.g., variations of the same quotation, can include more than two quotations such as, for example, ten, one hundred or many thousands of quotations.

A representative quotation is selected from among the first quotation and the second quotation (208). In some implementations, the quotation identification system selects a representative quotation from each set of quotation variations in a cluster. A representative quotation is a selected quotation from a set of quotation variations of the same quotation. In some implementations, the quotation identification system selects, for example, a representative quotation for each set of quotation variations of a quotation based on a comparison of the number of occurrences of each quotation variation, e.g., first quotation, in the set of resources to the numbers of occurrences of each other quotation variation, e.g., the second quotation, in the set of resources. For example, as described above, the first quotation of "an eye for an eye will leave the whole word blind" and the second quotation of "an eye for an eye leaves everyone in the world blind" are variations of the same quotation from Mahatma Gandhi.

Given that these are the only two quotation variations of the quotation, the quotation identification system compares the number of occurrences of the first quotation in a set of resources, e.g., all resources accessible through the Internet, and the number of occurrences of the second quotation in a set of resources, e.g., all resources accessible through the Internet. Based on the comparison, the quotation identification system selects one of the first and second quotations as the representative quotation for the quotation variations of Gandhi's quotation. In some implementations, the quotation identification system selects the quotation with the greatest number of occurrences as the representative quotation. As some clusters may have numerous sets of quotation variations, and each set of quotation variations can have a representative quotation, there can be more than one representative quotation from a cluster, e.g., each cluster.

In some implementations, the quotation identification system selects the quotation from a set of quotation variations for the same quotation as the representative quotation based on the number of occurrences of the quotation and the number of different resources on which the quotation occurs. For example, the quotation identification system selects the quotation with the greatest number of occurrences as the representative quotation provided the quotation occurs in a specified minimum number of different resources. If the quotation does not occur in the specified minimum number of different resources, the quotation identification system selects the quotation with the next greatest number of occurrences as the representative quotation provided the quotation occurs in the specified minimum number of different resources. If not, the quotation identification system continues this process until the quotation being analyzed, e.g., the remaining quotation with the greatest number of occurrences, exceeds the specified minimum number of different resources, in which case it will be selected as the representative quotation. The quotation identification system can, for example, discard the quotations that are not selected as representative quotations.

The representative quotations, the numbers of occurrences of the representative quotations and the numbers of different resources in which the representative quotations occur are stored in association with the respective entity to which the representative quotations are attributed. In some implementations, the quotation identification system stores such information in the quotations data store 106, e.g., for access and use during the online process 104.

In some implementations, the quotation identification can also select and store quotations that are not quotation variations, e.g., provided the number of occurrences of the quotation in the resources and the number of different resources on which the quotation occurs satisfy respective minimum thresholds. For example, a cluster may have two sets of quotation variations and two quotations that are not quotation variations, e.g., each of the two quotations is a unique quotation from each other quotation in the cluster. Provided the applicable thresholds are satisfied, the quotation identification system can select two representative quotations from the two sets of quotation variations and the two quotations that are not quotation variations for storage in the quotations data store.

In some of the above examples, the process 200 is performed on the first and second quotations; however, the process 200 can be performed on any number of identified quotations, e.g., hundreds, thousands or millions of quotations.

As described above, the process 200 is one of numerous processes to identify quotations. The process 300 is another process to identify quotations, for example, from news-related resources. In some implementations, the process 300 can be performed during the offline process 102. The process 300 can be performed, for example, by one or more data processors or computer systems, e.g., by the quotation identification system.

An entity is identified for which quotations are to be identified based at least in part on a frequency of submitted search queries that include a reference to the entity (302). In some implementations, the quotation identification system accesses search query records and determines frequencies of submitted search queries, e.g., the number of submitted search queries over a specified time period, that include references to various entities, or requests such entity and corresponding frequency data from the search service/system. Search query records can, for example, be derived from search query logs, include search query logs or both; and/or can be derived from other records of search queries. The search query record data may not be tethered to the identity of individual users. For example, the quotation identification system parses the search query records and determines that there were 68,945 search queries that included a reference to Entity 1 during the last two days and 54,001 search queries that included a reference to Entity 2 during the last two days. A search query includes a reference to an entity, for example, when the name of the entity, at least partially, is included in the text of the search query, the content of the search query describes or relates to the entity, or some combination thereof.

In some implementations, the quotation identification system periodically analyzes search query records, e.g., over a specified time period, to identify the frequencies of submitted search queries that include references to particular entities. When the frequency of submitted search queries that include a reference to a particular entity satisfies a threshold, e.g., 5,000/day, the quotation identification system determines the entity is an entity for which quotations are to be identified. Given the iterative analysis of the search query records, the frequency of submitted search queries for an entity may, for a first time period, satisfy the threshold for a time period and may, for other time periods, not satisfy the threshold. As such, in some implementations, the set of entities for which quotations are to be identified can vary depending on the particular time period.

In some implementations, in addition to or alternative to, identifying an entity for which quotations are to be identified based on a frequency of submitted search queries that include a reference to the entity, the quotation identification system can identify such an entity based on the numbers of resources referenced by search results for the submitted search queries that include quotations from the entity. For example, for a search query including "Mr. Smith," the quotation identification system can identify Mr. Smith as an entity for which quotations are to be identified based at least in part on the number of resources referenced by search results on the search results, resource responsive to the search query, that include quotations from Mr. Smith. The quotation identification system can, for example, identify Mr. Smith as an entity for which quotations are to be identified if the number of resources referenced by the search results that include quotations from Mr. Smith satisfy a threshold, e.g., six references.

Quotations attributable to the entity are identified that occur in particular resources in a set of resources (304). In some implementations, each of the particular resources are classified as being a news-related resource. As described above, the classification system can classify resources as news-related resources. In some implementations, the quotation identification system can access such resource classifications from a data store to determine news-related resources and identify quotations occurring in the news-related resources attributable to the entity, e.g., and each other entity identified in the process 302. A news-related resource is, for example, a resource that has been classified as belonging to a news classification/category. For example, resources 3, 5 and 6 in the set 220 are news-related resources.

In some implementations, the quotation identification system can, for example, identify a particular quotation in a news-related resource and determine that it is attributable to a particular entity based on expression templates, as described above, natural language processing the content of the news-related resource including the particular quotation, or some combination thereof. Natural language processing can be based on various machine learning algorithms such as decision tree learning, neural networks, support vector machines, Bayesian networks, association rule learning, to name a few.

For each of the quotations, a recency of the time period in which the quotation occurred in each of the particular resources is determined (306). The recency of the time period in which a quotation occurred in a particular resource describes how long ago, with respect to time, the quotation occurred, e.g., was first published, in the particular resource. For example, a quotation S, e.g., attributable to an identified entity, first published on resource X, a news-related resource, two days ago. The recency of the time period in which the quotation S occurred in resource X, e.g., first occurred in resource X, is two days. A quotation T first published on resource X four minutes ago. The recency of the time period in which the quotation T occurred in resource X, e.g., first occurred in resource X is four minutes. Thus the time period in which quotation T occurred is more recent than the time period in which quotation S.

The quotation identification system can determine recency in numerous ways. In some implementations, the quotation system can, for example, query the classification system, e.g., web crawler, to determine when the version of the resource including the quotation was first published. In some implementations, the quotation system can, for example, access a data store storing time-indexed representations of the resources, e.g., including multiple representations of past versions of the resources, and parse the data in the data store to determine a time at which the first representation including the relevant quotation was published.

A score for each quotation, relative to each other quotation, is determined based at least in part on the recency of the time period the quotation (308). In some implementations, the quotation identification system determines the score for each quotation. The quotation identification system can, for example, determine the score of the quotation as a function of its time period recency and/or a quality measure of the resource on which the quotation occurred. A quality measure of a resource indicates a measure of the creditability or quality of the resource, e.g., the reliability of information of the resource or confidence in the accuracy of the information presented on the resource. The quality measure can be based, for example, on feedback from visitors to the resource, the number of resources linking to the resource, to name a few. The quotation identification system can access the quality measure from a data store storing quality measures of resources.

In some implementations, the quotation identification system scores quotations that are recently published and have high quality measures higher than quotations that are less recently published and have lower quality measures. For example, for two quotations attributable to the same entity, a first quotation having a time period recency of ten minutes and occurring on a resource with a quality measure of ninety, out of a best quality measure of one hundred, and a second quotation having a time period recency of sixty minutes and occurring on a resource with a quality measure of forty, the quotation identification system would score the first quotation higher than the second quotation.

One or more of the quotations for presentation on a resource about the entity are selected based at least in part on the scores of the quotations (310). For example, the resource can be a search results resource responsive to a search query including a reference to the entity. In some implementations, the quotation identification system selects, for example, a set number of highest scoring quotations to present, e.g., the top three highest scoring quotations, or selects all quotations with scores that exceed a scoring threshold to present on the resource.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device, e.g., for purposes of displaying data to and receiving user input from a user interacting with the client device. Data generated at the client device, e.g., a result of the user interaction, can be received from the client device at the server.

Figure 4:
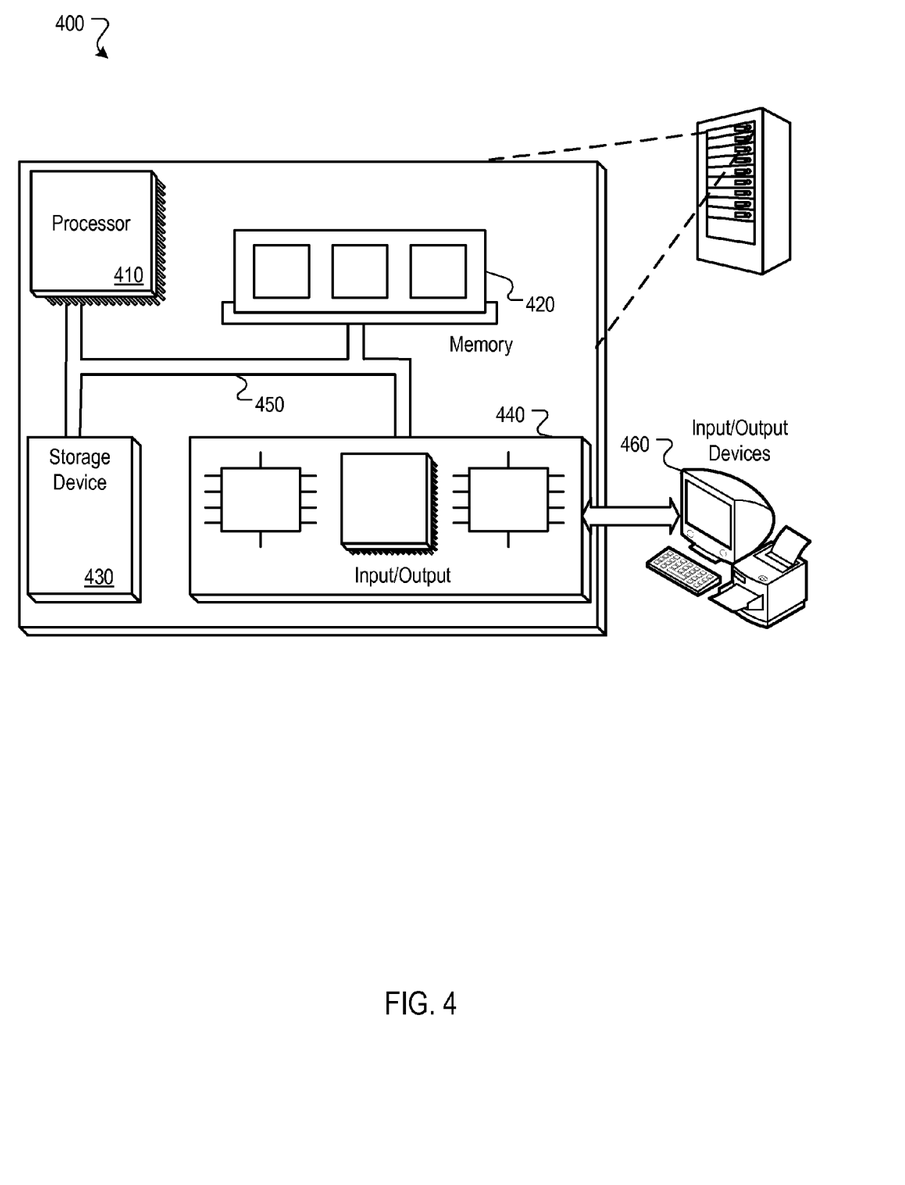
FIG. 4 is a block diagram of a programmable processing system.

An example of one such type of computer is shown in FIG. 4, which shows a block diagram of a programmable processing system (system). The system 400 that can be utilized to implement the systems and methods described herein. The architecture of the system 400 can, for example, be used to implement a computer client, a computer server, or some other computer device.

The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 460.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   identifying first and second quotations that occur in particular resources in a set of resources, each of the particular resources being classified as a quotation-related resource;
   determining, for each of the first and second quotations, a number of occurrences of the quotation in the set of resources and a number of different resources in the set of resources in which the quotation occurs;
   determining that the first quotation and the second quotation are (i) semantically related and (ii) not identical;
   selecting, by one or more data processors, a representative quotation from among the first quotation and the second quotation;
   storing the representative quotation, the number of occurrences of the representative quotation, and the number of different resources in which the representative quotation occurs in association with an entity to which the representative quotation is attributed;
   receiving a search query;
   determining, based on one or more terms of the search query, that the search query references the entity;
   in response to determining that the search query references the entity, determining, based on the stored number of occurrences of the representative quotation and the stored number of different resources in which the representative quotation occurs in association with the entity, to include a section that references information about the entity in a search result page that is responsive to the search query;
   in response to determining to include the section that references information about the entity in the search result page that is responsive to the search query based on the stored number of occurrences of the representative quotation and the stored number of different resources in which the representative quotation occurs in association with the entity, selecting the representative quotation; and
   providing, by a search engine to a user device, the search results page including the representative quotation in the section that includes information about the entity.

2. The method of claim 1, wherein selecting the representative quotation comprises:
comparing the number of occurrences of the first quotation in the set of resources to the number of occurrences of the second quotation in the set of resources; and
selecting the representative quotation based at least in part on the comparison.

3. The method of claim 1, wherein each of the first and second quotations is content delimited by quotation marks in the particular resources.

4. The method of claim 1, further comprising:
identifying a third quotation that occurs in particular resources; and
filtering and discarding the third quotation based on one or more filtering conditions specifying restrictions on content of the quotation.

5. The method of claim 4, wherein the restrictions comprise one or more of restrictions on numeric characters in the quotation, restrictions on the quotation commencing with lower case characters, restrictions on designated characters in the quotation, and restrictions on a number of capitalized terms in the quotation.

6. The method of claim 1, comprising discarding a one of the first and second quotations that is not the representative quotation.

7. The method of claim 1, comprising:
determining, for each of the first and second quotations, that the number of occurrences of the quotation in the set of resources exceeds a minimum occurrences threshold and that the number of different resources in the set of resources in which the quotation occurs exceeds a minimum different resources threshold.

8. The method of claim 1, wherein the set of resources includes resources that are not classified as quotation-related resources and the numbers of occurrences of the first and second quotations include occurrences in the resources that are not classified as quotation-related resources.

9. The method of claim 1, wherein determining whether to present the representative quotation in a search result page responsive to a search query that involves the entity based on the stored number of occurrences of the representative quotation and the stored number of different resources in which the representative quotation occurs in association with the entity, comprises:
receiving the search query;
determining that the search query includes one or more search terms associated with the entity;
in response to determining that the search query includes one or more search terms associated with the entity, accessing the stored representative quotation, the stored number of occurrences of the stored representative quotation, and the stored number of different resources in which the stored representative quotation occurs in association with the entity; and
determining whether to include the stored representative quotation in the search results page responsive to the search query based on the stored number of occurrences of the stored representative quotation and the stored number of different resources in which the stored representative quotation occurs.

10. The method of claim 1, wherein determining, based on one or more terms of the search query, that the search query references the entity comprises:
identifying one or more resources that are responsive to the search query;
determining whether a number of the one or more identified resources that include one or more quotations attributed to the entity satisfies a predetermined threshold; and
in response to determining that the number of the one or more identified resources that include one or more quotations attributed to the entity satisfies the predetermined threshold, determining that the search query references the entity.

11. A system comprising:
one or more data processors; and
instructions stored on a computer-readable storage apparatus that when executed by the one or more data processors cause the one or more data processors to perform operations comprising:
identifying first and second quotations that occur in particular resources in a set of resources, each of the particular resources being classified as a quotation-related resource;
determining, for each of the first and second quotations, a number of occurrences of the quotation in the set of resources and a number of different resources in the set of resources in which the quotation occurs;
determining that the first quotation and the second quotation are (i) semantically related and (ii) not identical;
selecting a representative quotation from among the first quotation and the second quotation;
receiving a search query;
determining, based on one or more terms of the search query, that the search query references the entity;
in response to determining that the search query references the entity, determining, based on the stored number of occurrences of the representative quotation and the stored number of different resources in which the representative quotation occurs in association with the entity, to include a section that references information about the entity in a search result page that is responsive to the search query;
in response to determining to include the section that references information about the entity in the search result page that is responsive to the search query based on the stored number of occurrences of the representative quotation and the stored number of different resources in which the representative quotation occurs in association with the entity, selecting the representative quotation; and
providing, by a search engine to a user device, the search results page including the representative quotation in the section that includes information about the entity.

12. The system of claim 11, wherein selecting the representative quotation comprises:
comparing the number of occurrences of the first quotation in the set of resources to the number of occurrences of the second quotation in the set of resources; and
selecting the representative quotation based at least in part on the comparison.

13. The system of claim 11, wherein each of the first and second quotations is content delimited by quotation marks in the particular resources.

14. The system of claim 11, wherein the instructions, when executed by the one or more data processors, cause the one or more data processors to perform operations comprising:
identifying a third quotation that occurs in particular resources; and
filtering and discarding the third quotation based on one or more filtering conditions specifying restrictions on content of the quotation.

15. The system of claim 14, wherein the restrictions comprise one or more of restrictions on numeric characters in the quotation, restrictions on the quotation commencing with lower case characters, restrictions on designated characters in the quotation, and restrictions on a number of capitalized terms in the quotation.

16. A non-transitory computer-readable medium storing software comprising instructions executable by one or more computers which, upon such execution, cause the one or more computers to perform operations comprising:

identifying first and second quotations that occur in particular resources in a set of resources, each of the particular resources being classified as a quotation-related resource;

determining, for each of the first and second quotations, a number of occurrences of the quotation in the set of resources and a number of different resources in the set of resources in which the quotation occurs;

determining that the first quotation and the second quotation are (i) semantically related and (ii) not identical;

selecting, by one or more data processors, a representative quotation from among the first quotation and the second quotation;

storing the representative quotation, the number of occurrences of the representative quotation, and the number of different resources in which the representative quotation occurs in association with an entity to which the representative quotation is attributed;

receiving a search query;

determining, based on one or more terms of the search query, that the search query references the entity;

in response to determining that the search query references the entity, determining, based on the stored number of occurrences of the representative quotation and the stored number of different resources in which the representative quotation occurs in association with the entity, to include a section that references information about the entity in a search result page that is responsive to the search query;

in response to determining to include the section that references information about the entity in the search result page that is responsive to the search query based on the stored number of occurrences of the representative quotation and the stored number of different resources in which the representative quotation occurs in association with the entity, selecting the representative quotation; and providing, by a search engine to a user device, the search results page including the representative quotation in the section that includes information about the entity.

17. The medium of claim 16, wherein selecting the representative quotation comprises:

comparing the number of occurrences of the first quotation in the set of resources to the number of occurrences of the second quotation in the set of resources; and selecting the representative quotation based at least in part on the comparison.

18. The medium of claim 16, wherein each of the first and second quotations is content delimited by quotation marks in the particular resources.

19. The medium of claim 16, the operations further comprising:

identifying a third quotation that occurs in particular resources; and filtering and discarding the third quotation based on one or more filtering conditions specifying restrictions on content of the quotation.

20. The medium of claim 19, wherein the restrictions comprise one or more of restrictions on numeric characters in the quotation, restrictions on the quotation commencing with lower case characters, restrictions on designated characters in the quotation, and restrictions on a number of capitalized terms in the quotation.

* * * * *